United States Patent [19]

Oka et al.

[11] Patent Number: 4,809,242

[45] Date of Patent: Feb. 28, 1989

[54] APPARATUS FOR PROCESSING FISH DETECTION SIGNALS

[75] Inventors: Yasuhiko Oka; Hideya Satoh, both of Yokohama, Japan

[73] Assignee: Katoh Electrical Machinery Co., Ltd., Yokohama, Japan

[21] Appl. No.: 90,893

[22] Filed: Aug. 31, 1987

[51] Int. Cl.$^4$ .............................................. G01J 15/96
[52] U.S. Cl. ....................................... 367/113; 367/111
[58] Field of Search ................ 358/83, 99, 112, 101, 358/107, 82; 367/113, 188, 95, 93, 11, 97, 111; 181/124; 73/290 R

[56] References Cited

U.S. PATENT DOCUMENTS

| | | | |
|---|---|---|---|
| 4,104,609 | 8/1978 | Minegishi et al. | 367/113 |
| 4,282,590 | 8/1981 | Wingate | 367/104 |
| 4,300,216 | 11/1981 | Barton, Jr. | 367/113 |
| 4,324,135 | 4/1982 | Peyton | 367/134 |
| 4,479,206 | 10/1984 | Granberg et al. | 367/113 |
| 4,597,069 | 1/1986 | Milano et al. | 367/108 |
| 4,651,309 | 3/1987 | Honda | 367/108 |
| 4,653,032 | 3/1987 | Schwarz et al. | 367/113 |
| 4,672,589 | 6/1987 | Yoshida et al. | 367/113 |
| 4,690,150 | 9/1987 | Mayo | 358/112 |

FOREIGN PATENT DOCUMENTS 0281987 12/1986 Japan ................................. 367/113

*Primary Examiner*—John W. Shepperd
*Assistant Examiner*—John K. Peng
*Attorney, Agent, or Firm*—George B. Oujevolk

[57] ABSTRACT

Disclosed is a signal processor for an ultrasonic fish detector, in which the signal processing circuit is arranged separately from the display unit, whereas conventionally both are configured integrally, within a case with the provision of a composite converting circuit and RGB converting circuit with associated video output terminal and RGB output terminal, thereby allowing the user to configure a fish detection system by merely purchasing the fish detection signal processor made up of the signal processing circuit and a transducer and utilizing a home television set or an RGB graphics monitor oriented to personal computers.

5 Claims, 4 Drawing Sheets (a)

(b)

(c)

APPARATUS FOR PROCESSING FISH DETECTION SIGNALS

BACKGROUND OF THE INVENTION

1. Field of the Invention

The present invention relates to a fish detection signal processor which partly constitutes a fish detector.

2. Description of the Prior Art

Conventional fish detectors consist of a signal processor and a display unit, and they are generally packaged inseparably within a case. In the sea, lakes and large rivers, leisure fishing by use of a leisure boat is gaining the popularity in recent years. On such occasions, hobbyists are urged to use a ultrasonic fish detector, but the apparatus is too expensive to become prevalent. The expensiveness of conventional fish detectors is mainly attributable to the use of a costly display unit. By the way, home television sets are prevalent remarkably in recent years, and many families own a plurality of television sets and even have an RGB graphics monitor oriented to personal computers. It is also a reality that a growing number of leisure boats are equipped with a television set from the beginning.

SUMMARY OF THE INVENTION

It is an object of this invention to provide a fish detection signal processor for a fish detector which is rid of the exclusive display unit built in the conventional apparatus, but instead is operative by use of various commercialized display appliances including home television sets and RGB graphics monitors for personal computers.

DESCRIPTION OF THE PREFERRED EMBODIMENT

Figure 1:
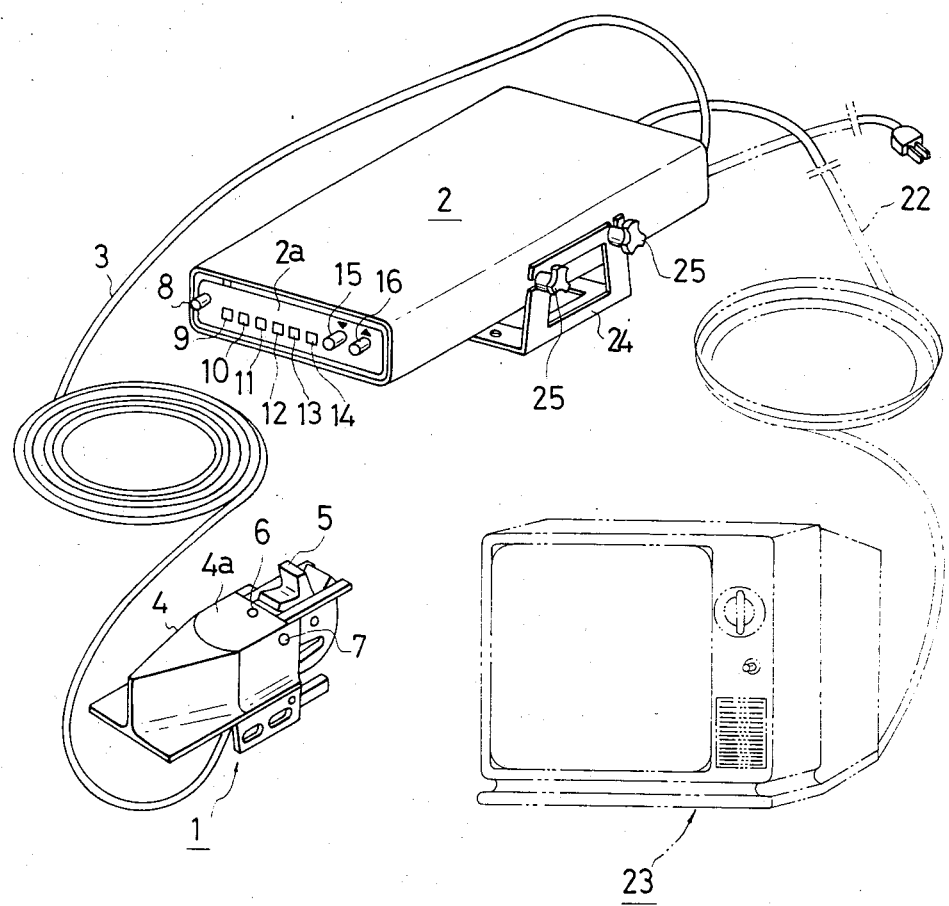
FIG. 1 is a perspective view showing from the front the fish detection signal processor according to the present invention.

An embodiment of the present invention will now be described in detail with reference to the drawings. In FIG. 1, shown by symbol 1 is a transducer and 2 is a case in which the signal processing circuit is accommodated. The transducer 1 and the case 2 are connected through a cable 3, and these components constitute the fish detection signal processor of this invention.

The transducer 1 including a ultrasonic wave transmitter-receiver 4a is assembled on a chassis 4, which is provided with a propeller 5 with a magnet being embedded in its tip for measuring the boat speed, a magnetic sensor 6 for detecting the magnetism of the magnet, and a thermistor for measuring the water temperature.

The case 2 has a front panel 2a, which is provided with a volume-switch knob 8 for turning on/off power and adjusting the input sensitivity, an RNG button switch 9 for range selection, a shift key 10 used to measure the range below the depth under measurement, an SCR switch 11 for adjusting the sweep speed of the screen, an SCA switch 12 for turning on or off the horizontal scale, a data switch 13 used to display measurement data such as the water temperature, power voltage, depth and boat speed, a CLR switch 14 for turning on or off the color display mode, a shallow alarm knob 15 for setting a shallow level of detection, and a deep alarm knob 16 for setting a deep level of detection.

Figure 2:
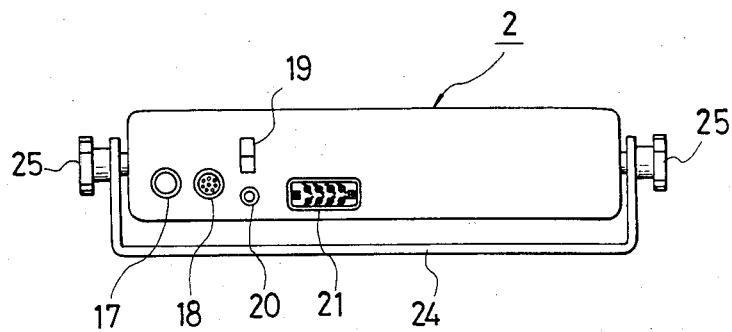
FIG. 2 is a rear view of the case of the processor.
Figure 3:
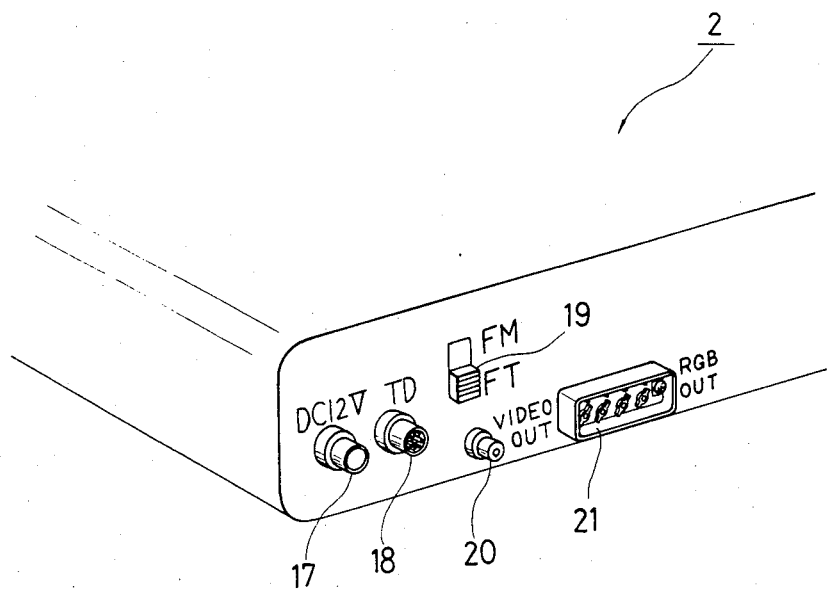
FIG. 3 is a perspective view showing from the rear a part of the case of the processor.
Figure 5:
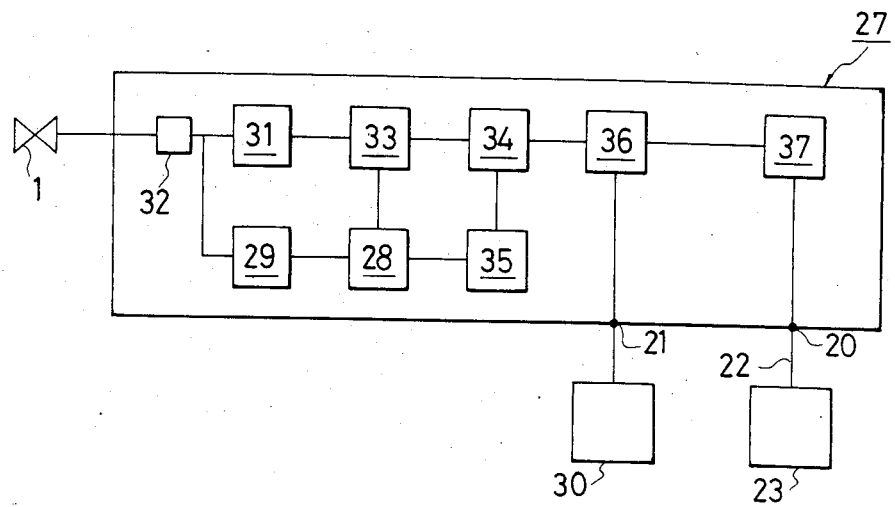
FIG. 5 is a block diagram showing the fish detection signal processor according to the present invention.

Provided on the back panel of the case 2 are a power connector 17, a transducer connector 18, a depth selector switch 19 for selecting the unit of depth, a video output connector 20 used for a home television set, and an RGB output connector 21 used for an RGB graphics monitor, as shown in FIGS. 2 and 3. To be connected to the video output connector 20 through the cable 22 is, for example, a commercialized monochromatic or color home television set 23 having the video input terminal prepared separately from the fish detection signal processor, as shown by the imaginary line in FIG. 1. Alternatively, to be connected to the RGB output connector 21 is a commercialized RGB graphics monitor 30 (i.e., a display unit oriented to personal computers), as shown in FIG. 5. The case 2 has in its mid section the fitting of a fixing bracket 24 with screws 25, as shown in FIGS. 1 and 2.

FIG. 5 shows in block diagram the fish detection signal processor shown in FIG. 1. A signal processing circuit indicated by symbol 27 in the figure includes a CPU (Central Processing Unit) 28, a transmitter 29, receiver 31, a transmission/reception switching circuit 32, which is connected to a transducer 1, an A/D converter 33, a memory 34, a memory controller 35, an RGB converting circuit 36, a composite converting circuit 37 for converting the output signal of the RGB converting circuit 36 into the television signal used for a home television set (monochromatic or color), an RGB output terminal 21 for an external RGB graphics monitor, and a video output terminal 20 for the external home television set.

Figure 6:
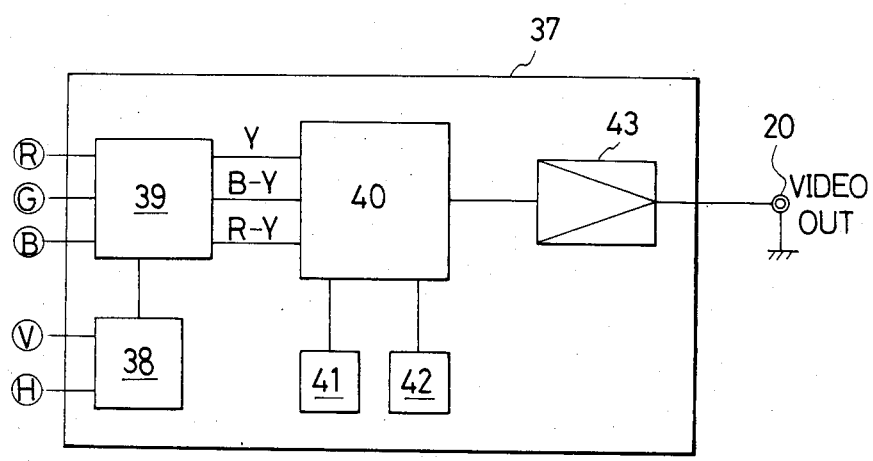
FIG. 6 is a block diagram showing the composite converting circuit shown in FIG. 5.

The composite converting circuit 37 is as shown in FIG. 6 for example, in which are included a matrix circuit 38 for matrixing the vertical sync signal V and horizontal sync signal H, a matrix circuit 39 for matrixing the R, G and B signals, a modulator 40 which has the application of a chrominance carrier signal 41 and reference voltage 42, an amplifier 43, and a video output terminal 20.

Figure 4:
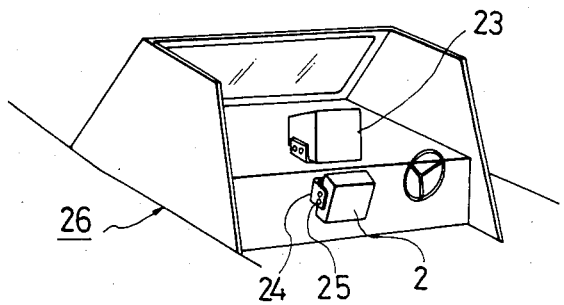
FIG. 4 is a set of perspective views exemplifying the installation of the processor in boats.
Figure 4:
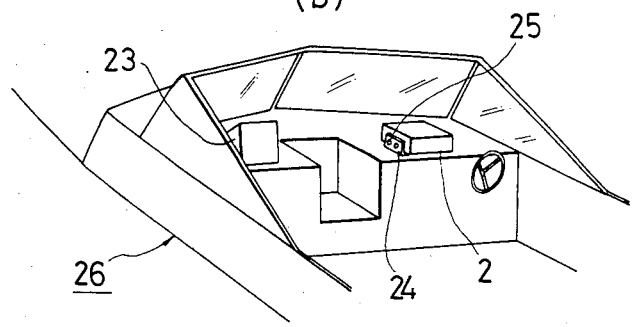
Figure 4:
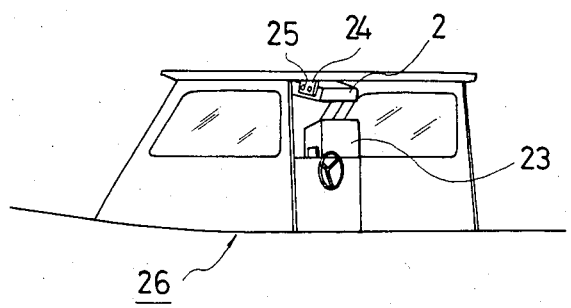

According to the present invention, the signal processing circuit 27 accommodated in the case 2 can be installed using the fixing bracket 24 in arbitrary place within a leisure boat 26 for example, as shown in FIG. 4.

The transducer 1 which is connected to the signal processing circuit 27 through the cable 3 is turned on by the operation of the switch 8 on the front panel, and it transmits the ultrasonic wave produced from the signal sent from the tranmsmitter 29 by way of the transmission/reception switching circuit 32 under control of the memory controller 35 and CPU 28 within the circuit 27. The ultrasonic acoustic signal coming back after being reflected by shoals of fish or the bottom of water is received by the transducer 1, by which it is transformed into an electrical signal, and then received by the receiver 31 by way of the transmission/reception switching circuit 32. The signal is fed through the A/D converter 33 and memory 34 controlled by the CPU 28 and memory controller 35 to the RGB converting circuit 36. The RGB converting circuit 36 produces an output signal, which is fed through the RGB output terminal 21 to the RGB graphics monitor 30 on which the image carried by the signal is displayed. In case a home television set 23 with the video input terminal is used as a display unit, the output signal from the RGB converting circuit 36 is fed to the composite converting circuit 37 arranged as described above, and the video signal produced by it is conducted through the video output terminal 20 to the home television set 23.

The composite converting circuit 37 has its matrix circuit 38 matrixing the vertical sync signal V and horizontal sync signal H, and the resulting signal is fed to the matrix circuit 39 which matrixes it with the R, G and B signals provided by the RGB converting circuit 36. The circuit 39 has its outputs received by the modulator 40 to which the chrominance carrier signal 41 and reference voltage 42 are applied, and the resulting signal is amplified by the amplifier 43 and delivered to the video output terminal 20.

The display operation is controlled using the switches and knobs on the front panel 2a of the case 2 as follows. For example, by pressing the RNG switch 9, the maximum depth for display measured from the water surface is switched. The measuring depth is 480 feet in this embodiment. The shift key 10, by being pressed, allows the observation of a range more deeper than the depth under measurement. For example, the key 10 provides a display of the range from 480 to 960 feet at the measurement setup for the range from 0 to 480 feet. The SCR key 11 is to select a screen sweep speed from among five settings including "still" for example. The SCA switch 12 turns on or off the horizontal scale on the screen.

Pressing the data display switch 13 operates on the processor to display the water temperature, depth, boat speed, power voltage, etc. provided by respective sensors including the ultrasonic wave transmitter-receiver 4a, magnetic sensor 6 and thermistor 7 mounted on the transducer chassis 4. The CLR switch 14 is to set or cancel and color display mode. The shallow alarm knob 15 and deep alarm knob 16 are preset so that an acoustic alarm is emitted when the boat has entered the setup shallow or deep water, thereby preventing the accident such as aground ship.

According to the present invention, the signal processing circuit 27 is configured separately from the display unit, whereas conventionally both are made to have an integral structure, with the composite converting circuit 37 being incorporated therein so that a usual prevailing display unit such as a home television set 23 having the video input terminal can be connected, whereby a drastic cost reduction is achieved by eliminating a costly display unit. In addition, the signal processing circuit 27 has the provision of the RGB output terminal 21 for connection with a commercialized RGB graphics monitor, thereby enhancing the applicability. It is also possible to record the video signal produced by the inventive processor through the connection of a video tape recorder to the video output terminal.

What is claimed is:

1. A fish detection signal processor arrangement for use on a boat, comprising in combination:
   (a) a transducer (1) for converting an audio signal into an electrical signal, located in a case (4) said case having a front and rear end, the front end being outwardly tapered and an ultrasonic wave transmitter/receiver (4a) therein coupled to said transducer;
   (b) a propeller-like paddle wheel (5) with tips to the paddles of said wheel at the rear end with at least one magnet embedded in one of said tips for measuring boat speed as the paddle wheel rotates, also a magnet sensor (6) for detecting a magnet in said paddle wheel tip, also a thermistor for measuring water temperature;
   (c) a signal processing unit in case means (2), with a cable (3) extending between the signal processing unit (2) and the transducer;
   (d) front and rear panels on said case means with switches and knobs for controlling the signal processing unit and the transducer; and, said signal processing unit including:
   (e) a receiver (31) coupled to said transducer (1) across said cable (3) including a transmission/reception switching circuit (32), an analog/digital converter (33) coupled to said receiver (31) and a memory (34) coupled to said converter (33), also a converting circuit (36) for converting the output of said memory to a visual input which can be applied to a television set.

2. A fish detection signal processor comprising a transducer, a case, and a signal processing circuit which is connected with said transducer through a cable and accommodated within said case, said case having a video signal output terminal and a RGB output terminal, said signal processing circuit including a composite converting circuit and a RGB converting circuit, said video signal output terminal is connected to said composite converting circuit, said RGB output terminal is connected to said RGB converting circuit, so that both of a commercialized home television set having a video input terminal and a commercialized RGB graphics monitor can be used to display the output of said signal processing circuit.

3. A fish detection signal processor comprising a transducer, a case, and a signal processing circuit which is connected with said transducer through a cable and accommodated within said case, said case having a video signal output terminal and a RGB output terminal, said signal processing circuit including a composite converting circuit and a RGB converting circuit, said composite converting circuit consisting a matrix circuit for matrixing R, G and B signals provided by said RGB converting circuit and signals provided by matrixing a vertical sync signal V and horizontal sync signal H, a modulator for modulating a chrominance carrier signal, a reference voltage and signals provided by said matrix circuit, and an amplifier for amplified signals provided by said modulator, said video signal output terminal is connected to said composite converting circuit, said RGB output terminal is connected to said RGB converting circuit, so that both of a commercialized home television set having a video input terminal and a commercialized RGB graphics monitor can be used to display the output of said signal processing circuit.

4. A fish detecting signal processor comprising a transducer, a case, and a signal processing circuit which is connectd with said transducer through a cable and accommodated with said case, said case having a video signal output terminal and a RGB output terminal, said signal processing circuit including a composite converting circuit and a RGB converting circuit, said video signal output terminal is connected to said composite converting circuit, said RGB output terminal is connected to said RGB converting circuit, so that both of a commercialized home television set having a video input terminal and a commercialized RGB graphics monitor can be used to display the output of said signal processing circuit, said case being further provided with a fixing bracket.

5. A fish detection signal processor comprising a transducer, a case, and a signal processing circuit which is connected with said transducer through a cable and accommodated within said case, said case having a video signal output terminal and a RGB output terminal, said signal processing circuit including a composite converting circuit and a RGB converting circuit, said video signal output terminal is connectd to said composite converting circuit, said RGB output terminal is connected to said RGB converting circuit, so that both of a commercialized home television set having a video input terminal and a commercialized RGB graphics monitor can be used to display the output of said signal processing circuit, said case being further provided with a fixing bracket, said fixing bracket is separable mounted on a mid section of said case.

* * * * *